Aug. 9, 1966    F. LYTHGOE    3,265,232
MATERIAL HANDLING DEVICES
Filed Nov. 12, 1964    4 Sheets-Sheet 2

INVENTOR:
FRANK LYTHGOE
BY Kenwood Ross
ATTORNEY.

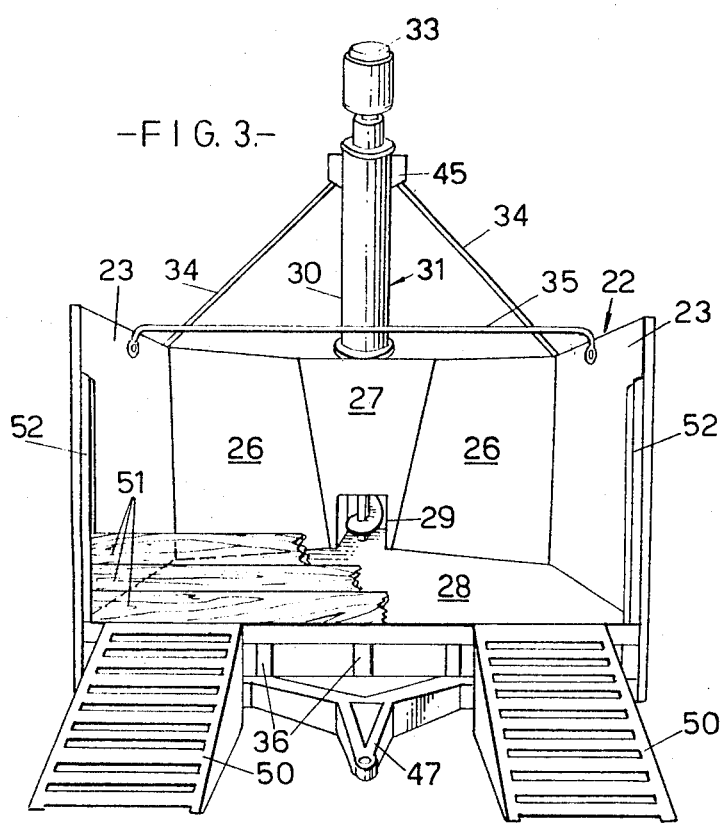

Aug. 9, 1966  F. LYTHGOE  3,265,232
MATERIAL HANDLING DEVICES
Filed Nov. 12, 1964  4 Sheets-Sheet 4
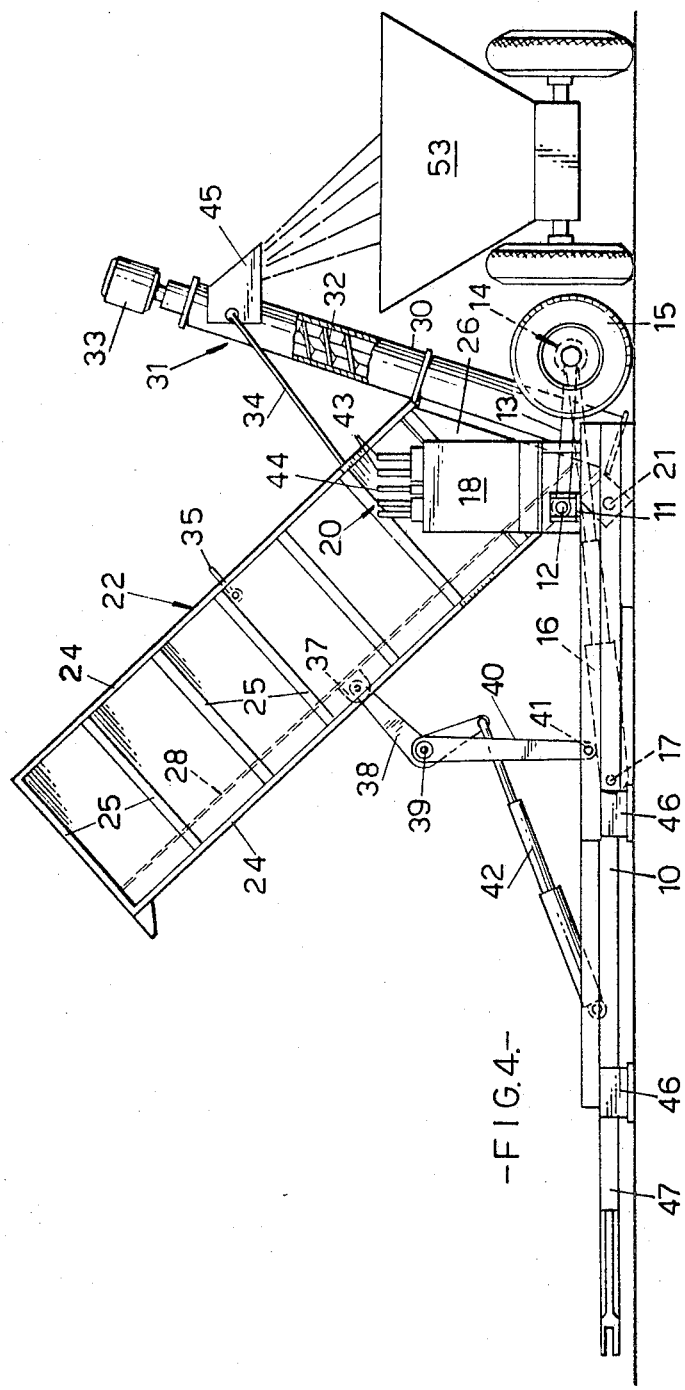
—FIG.4.—
INVENTOR:
FRANK LYTHGOE
BY Kenwood Ross
ATTORNEY.

United States Patent Office 3,265,232
Patented August 9, 1966

3,265,232
MATERIAL HANDLING DEVICES
Frank Lythgoe, Park Farm,
Warburton, near Lymm, England
Filed Nov. 12, 1964, Ser. No. 410,612
14 Claims. (Cl. 214—501)

This invention concerns material handling devices for receiving and dispensing bulk granular or pulverulent materials.

In the application of lime and other materials to agricultural farm land, it is usual for the farmer to arrange for the lime or the like to be delivered by truck on the day spreading is intended to be effected. Upon arrival of the truck, the contents are shovelled manually into a spreader which, when full, is employed straight away to spread the material over the land.

The capacity of a spreader is, usually considerably less than that of the truck, so that loading of the spreader and spreading of the material has to be done in a number of successive batches. As a result, there is a considerable wastage of time. The truck driver has to wait a considerable time, often many hours, before the whole load is off-loaded from the truck into the spreader. Much manual labour is concerned in shovelling the material, usually involving the employment of labourers who are idle during the actual spreading. Furthermore, the truck itself, which represents a substantial capital investment, is idle during almost the whole of the time taken to do the spreading.

An object of the present invention is to provide a material handling device which can be employed to eliminate the disadvantages enumerated in the foregoing, although its use is not confined to the handling of agricultural materials.

According to the present invention there is provided a transportable material handling device for receiving and dispensing bulk granular or pulverulent materials comprising a hopper adapted for the reception, direct from a tipping truck or the like, of bulk material, said hopper being adapted for tilting so that material therein will move, by gravity, to an outlet provided with a conveyer by which the hopper's contents can be discharged.

In order that the invention may be fully understood, it will be described further, by way of example, with reference to the accompanying drawings, in which:

FIG. 3 is an enlarged front perspective view of the device, corresponding to FIG. 2; and FIG. 4 is a front elevation similar to FIG. 2 but showing the hopper tilted for discharging its contents.

Figure 1:
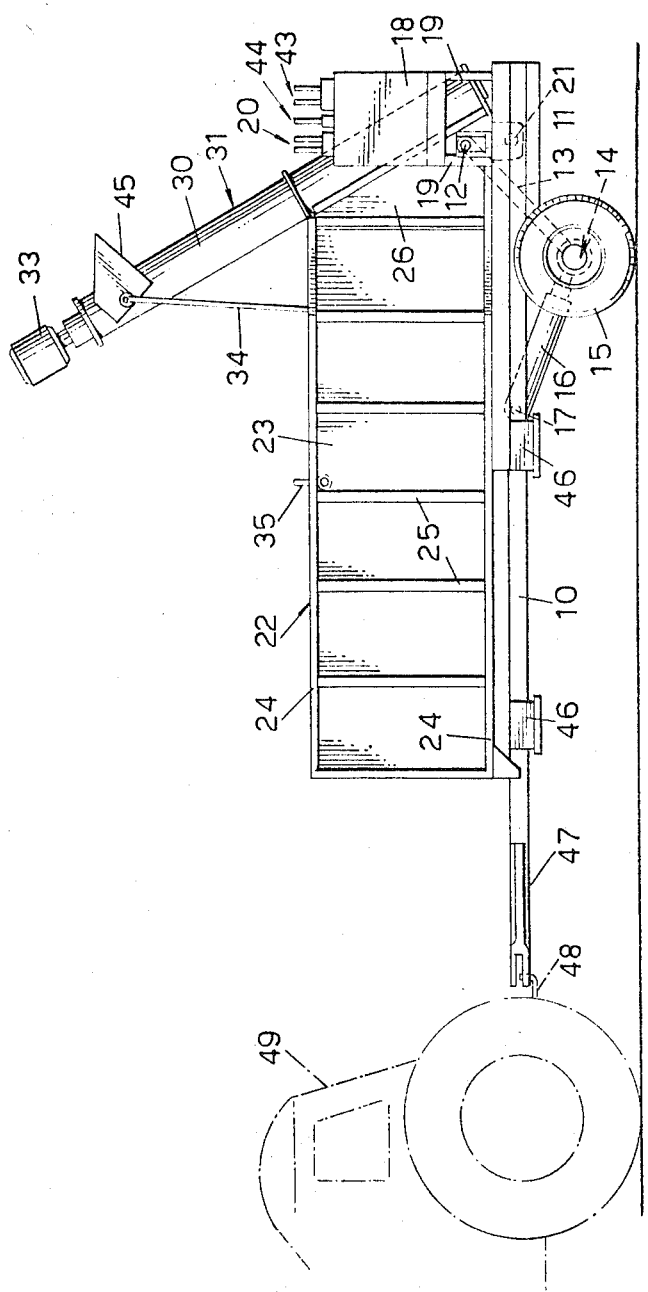
FIG. 1 is a diagrammatic side elevation showing a preferred embodiment of the material handling device according to the invention in its disposition for transportation.

The device illustrated comprises a robust chassis 10 provided, adjacent its rear end, with upstanding brackets 11 wherein are secured horizontal pivot stubs 12, one adjacent each side of the chassis 10. These stubs 12 provide pivots each for one end of a respective swingable leg 13 the other end of which is connected to the axle casing of a rear axle (indicated generally by reference numeral 14) whereon road wheels 15 are mounted.

Secured to the casing of the axle 14 is one end of each of a pair of first telescopic hydraulic rams 16, the other ends of which are pivotally connected, as at 17, to the chassis 10 about midway along the length of the latter. A hydraulic oil reservoir 18 is mounted on the rear of the chassis 10 at one side thereof, by way of supports 19 and a petrol engine driven pump (not visible in the drawings) is similarly mounted in a corresponding position at the other side of the chassis 10. The rams 16 are connected, by appropriate flexible tubes (not shown) to the reservoir 18 by way of manually operable valves 20 on the reservoir 18 and the pump.

Pivotally mounted at 21 on the chassis 10 is a sheet metal hopper 22 composed of longitudinal sidewalls 23 each of which is reinforced by channel member 24 provided along its top and bottom edges and by upright member 25. At the rear end of the hopper 22, the sidewalls 23 each connected with a respective inclined transition wall 26 which walls 26 merge with an inclined front wall 27 (FIG. 3) provided, where it joins with floor 28 of the hopper, with an outlet aperture 29. Secured to the front wall 27 is the bottom end of the tubular casing 30 of a conveyor in the form of a screw elevator 31, the casing 30 enclosing a screw 32 adapted to be driven by a hydraulic motor 33 mounted on the upper end of the casing 30. Rigidity is imparted to the upper end of the casing 30 by struts 34 which connect with the sidewalls 23 of the hopper 22, and such sidewalls 23, too, may be stiffened by cross struts such as the strut 35 of FIG. 3.

As can be seen particularly from FIG. 3, the floor 28 of the hopper 22 is slightly above the level of the lower edges of the sidewalls 23, and such floor 28 has longitudinal joists 36 therebelow for strength. Pivotally connected to a bracket 37 (FIG. 4) disposed below the floor 28 approximately at the middle position of the latter is a lever arrangement, which as shown, comprises a bell crank lever 38 pivoted at its angle, at 39, to one end of a swingable arm 40 the other end of which is pivoted at 41 to the chassis 10. One arm of the bell crank lever 38 is connected to the bracket 37 whilst the other arm thereof is pivotally connected to one end of a second hydraulic ram 42 which, in turn, is pivotally connected by its other end of the chassis 10 near the front end thereof. This arrangement permits raising and lowering of the hopper 22 as will later be described, but it will be appreciated that other lever arrangements can be employed between the second ram 42 and the hopper 22 for raising and tilting the latter.

The second ram 42 is connected to the reservoir 18 by way of the pump and valves 43, and a further valve 44 on the reservoir 18 serves to control the supply of hydraulic fluid, by pump, to the hydraulic motor 33 of the conveyor 31.

The outlet 29 of the hopper 22 opens into the casing 30 of the conveyor 31 near the bottom of the latter, and near to the top of the casing 30 is a conveyor outlet (not visible) provided with a deflector or guide 45 which serves to deflect material emerging from the conveyor outlet in an appropriate downward direction.

As can be seen from the various figures, the chassis 10 has feet 46 at its front end and about midway along its length, and a tow bar 47 is rigidly connected to the front of the chassis 10.

FIG. 1 shows the whole device in its condition for transportation. The hopper 22 is in its lowered position resting on the chassis 10 and the first rams 16 are fully retracted corresponding the forward (or "lowered") position of the axle 14 and the wheels 15. Thus, the rear end of the chassis 10 is held, by the axle 14, in a raised position, the legs 13 engaging against appropriate forward abutments (not shown) in this position. The front end of the chassis 10 is held in the corresponding raised position by a towing hitch 48, which can be raised or lowered, of a suitable towing vehicle 49 which is shown as being an agricultural tractor. Appropriate connections are, of course, provided between brakes on the wheels 15 and the usual braking system of the tractor 49. In this condition, the device can be appropriately transported from location to location, as desired.

Figure 2:
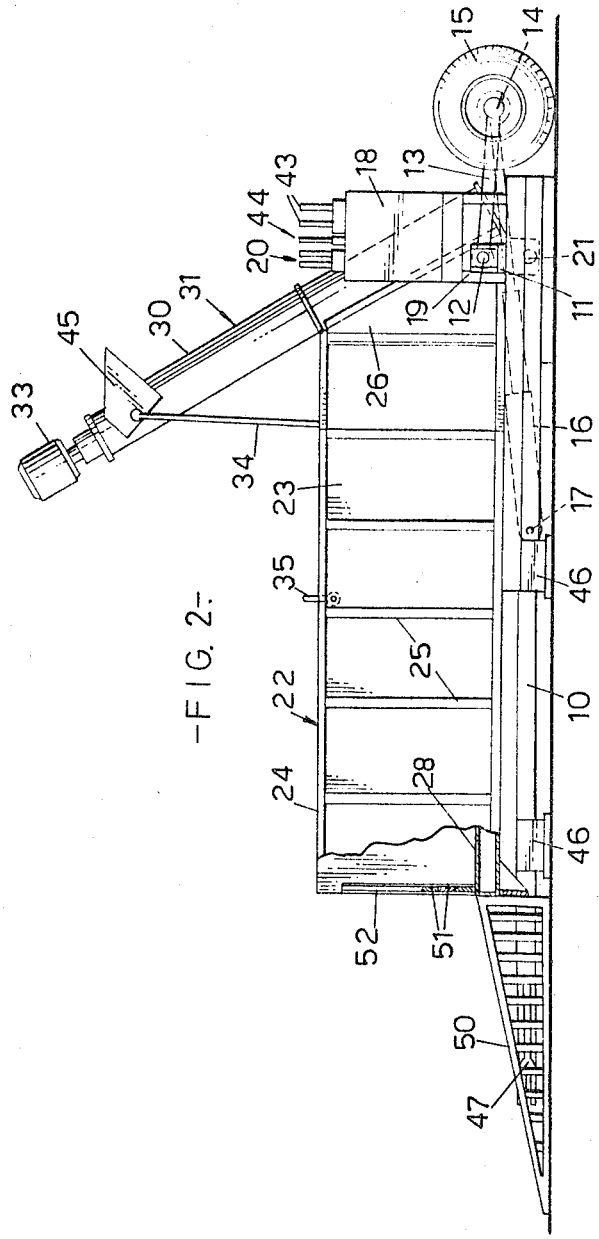
FIG. 2 is a view similar to FIG. 1 but showing the device with its hopper lowered to the ground ready for the reception of bulk material.

When the device has been brought to an appropriate location where it is to be used, it is set down upon the ground in the condition shown in FIGS. 2 and 3. To do this, firstly, the towing hitch 48 is lowered to lower the front end of the chassis 10 onto the corresponding legs 46, and the tow bar 47 is uncoupled from the hitch 48. Thereupon, the engine of the pump is started, and the valves 20 operated to cause the first rams 16 to extend. This causes the axle 14 to swing firstly rearwardly and downwardly and then, after the legs 13 pass through vertical positions, rearwardly and upwardly until it reaches the position of FIGS. 2 and 4, which position is defined by the legs 13 engaging rear abutments (not visible). The valves 20 are then closed, and the pump's engine can, if desired, be switched off.

Ramps 50 are provided as part of the device, and these are then positioned so as to constitute inclined extensions of the hopper floor 28, as shown in FIGS. 2 and 3. These ramps 50 can, of course, be kept in the hopper 22 when the device is not being used, or when it is being transported.

A truck (not shown) can now reverse up the ramps 50, the width of the hopper 22 and the spacing between its sidewalls being such that such truck can, if desired, enter by its rear end, into the front open end of the hopper and, thereupon, tip its contents into the hopper. In this instance, the strut 35 may be removed to allow the truck to enter right into the hopper if desired. The contents may, for instance, be lime, but other granular or pulverulent materials may, of course be concerned. Should the material be very free flowing, then boards 51 (FIG. 3) may be positioned across the front open end of the hopper to an appropriate height, appropriate channels 22 being provided on each sidewall 23 for this purpose. Instead of being backed into the hopper 22 as just described, the truck will, then, be brought to an appropriate position on the ramps 50 for tipping its load over the boards 51 into the hopper 22.

It will be appreciated that the truck will be able to tip its entire load into the hopper 22, and consequently the time involved in unloading the truck is an absolute minimum, and no manual labour is involved.

For discharging the contents of the hopper, the latter is now tilted from the FIG. 2 position to that of FIG. 4. To do this, the pump's engine is started again and the valves 43 are operated to cause the second ram 42 to be extended. This causes the hopper to be swung, after the manner of the body of a tipper trunk, about its pivots 21 to the inclined position of FIG. 4 wherein the contents of the hopper 22 move by gravity towards the outlet 29. Assuming an appropriate receiver, such as a spreader 53 as shown in FIG. 4, to be appropriately positioned beneath the deflector or guide 45, the material in the hopper 22 can be discharged by operating the valve 44 to cause the screw 32 to be driven by the motor 33. The screw 32 conveys the material upwards through its casing 30 to the conveyor outlet from which it falls, via the deflector 45, into the spreader 53, as shown. When the spreader is full, it can be driven away and used to distribute the material, as desired, subsequently returning for further loads of the material as necessary. The hopper 22 is, of course, retained in the upwardly tilted position either until it is empty or until it is desired to discharge more bulk material therein from a subsequent truck.

It will be appreciated that the whole device can be operated satisfactorily by one operative who can, of course, do the spreading as well as operating the device of the invention, and consequently the arrangement of the invention serves materially to reduce the costs involved in taking delivery of and making subsequent use of the material concerned.

The invention is not, of course, confined to the precise details of the foregoing example and variations may be made thereto. For instance an elevator can be employed in place of the screw conveyor, and different arrangements can be employed for raising and lowering the road wheels and for raising and lowering the hopper.

The device can, of course, be used with materials other than agricultural materials. For instance, on building sites it could be used for receiving sand or aggregate and for feeding this to a concrete mixer.

I claim:
1. A transportable material handling device for receiving and dispensing bulk particulate materials comprising:
   (1) a chassis,
   (2) a mobile hopper mounted on the chassis and having a front open end,
   (3) means for tilting the hopper relative to the chassis,
   (4) an axle at one end of the chassis and means connected to the chassis and axle to raise and lower the chassis relative to the ground,
   (5) ramp means positionable adjacent the said open end to enable a truck to back up to said hopper and thereinto if so desired,
   (6) a discharge conveyor mounted on the hopper whereby upon tilting of the hopper materials will move by gravity to the conveyor for discharge.

2. In the device of claim 1, the chasis being adapted to be raised clear of the ground for transportation.

3. A device as claimed in claim 1 wherein the axle is carried by legs swingable relative to the chassis.

4. A device as claimed in claim 3 wherein hydraulic rams serve to move the axle relative to the chassis.

5. A device as claimed in claim 1 wherein the chassis is provided at its other end with a drawbar.

6. A device as claimed in claim 1 wherein the hopper comprises a floor and longitudinal sidewalls and inclined transitional walls at one end merging into an inclined front wall, with an outlet being provided in the inclined front wall where the latter meets the floor, and wherein the other end of the hopper is open for entry of the rear of a tipping truck therein.

7. A device as claimed in claim 6 wherein opposed channel members are provided on the sidewalls adjacent the open other end of the hopper, the channels being adapted to receive boards over which a truck may tip material into the hopper.

8. A device as claimed in claim 6 further including ramps positionable adjacent the open end of the hopper to enable a truck to back up to the hopper and run onto the floor.

9. A device as claimed in claim 6 wherein the walls of the hopper are of sheet metal provided with reinforcing members.

10. A device as claimed in claim 6 wherein the floor of the hopper is provided on longitudinal joints.

11. A device as claimed in claim 6 wherein the conveyor is an upwardly projecting screw conveyor having a casing secured by its lower end to the inclined front wall and extending upwards above the front wall, the outlet of the hopper opening into the casing.

12. A device as claimed in claim 11 wherein the casing encloses a motor driven screw.

13. A device as claimed in claim 11 wherein an outlet is provided in the conveyor casing near to the top thereof, with a deflector being arranged at the outlet for deflecting material from the outlet in a downward direction.

14. A device as claimed in claim 6 wherein the hopper is pivotally mounted upon the chassis, with a second hydraulic ram being prrovided fir tilting the hopper by swinging it about its pivot.

References Cited by the Examiner

UNITED STATES PATENTS

| | | | |
|---|---|---|---|
| 2,851,181 | 9/1958 | Thomann | 214—506 |
| 2,995,399 | 8/1961 | Riseborough | 214—505 X |
| 3,024,932 | 3/1962 | Dodgen | 214—83.32 X |
| 3,128,894 | 4/1964 | Nelson | 214—509 |
| 3,135,401 | 6/1964 | Schramm | 214—512 X |
| 3,153,544 | 10/1964 | Jung et al. | 214—512 X |
| 3,215,296 | 11/1965 | Preston | 214—506 |

GERALD M. FORLENZA, *Primary Examiner.*

ALBERT J. MAKAY, *Examiner.*